United States Patent [19]

Coop

[11] 4,054,069
[45] Oct. 18, 1977

[54] ELBOW-MAKING MACHINE
[75] Inventor: Vernon W. Coop, Pico Rivera, Calif.
[73] Assignee: Bazil H. Sugden, Bell Gardens, Calif.
[21] Appl. No.: 743,403
[22] Filed: Nov. 19, 1976
[51] Int. Cl.² .......................... B23B 3/06; B23B 5/14
[52] U.S. Cl. ......................................... 82/57; 82/46; 82/53.1; 82/101
[58] Field of Search .................. 82/46 R, 53.1, 54, 55, 82/57, 70.2, 73, 89, 90, 93, 101, 102, 71

[56] References Cited
U.S. PATENT DOCUMENTS

| | | | |
|---|---|---|---|
| 1,345,458 | 7/1920 | Pierce | 82/57 |
| 3,208,320 | 9/1965 | Anderson | 82/71 |
| 3,212,375 | 10/1965 | Suizu | 82/101 X |
| 3,589,220 | 6/1971 | Saxon | 82/46 |

FOREIGN PATENT DOCUMENTS 958,426  5/1964  United Kingdom ................ 82/101

Primary Examiner—Harrison L. Hinson
Attorney, Agent, or Firm—Donald D. Mon

[57] ABSTRACT

Mechanism to cut sections for furnace pipe elbows from a tube. The mechanism includes means for relatively axially shifting a cutter means and the tube being cut, and positioning means for turning the cutter means so as to track along an oblique cut around the tube. The positioning means includes a wobble plate whose oscillation is followed by means which turns the cutter means in order to track the cutter path.

20 Claims, 11 Drawing Figures

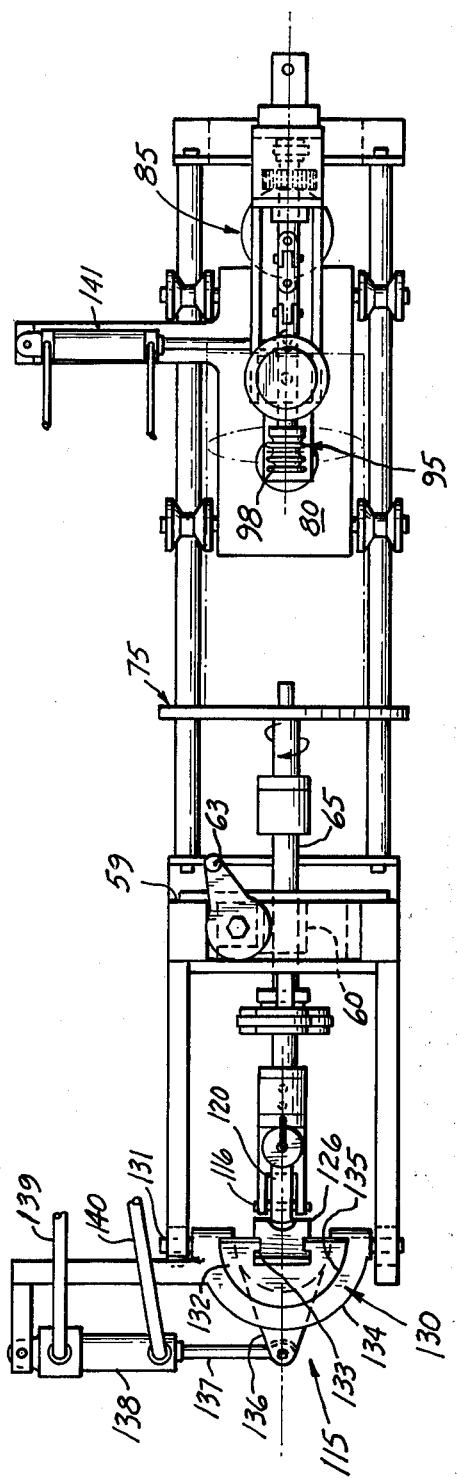
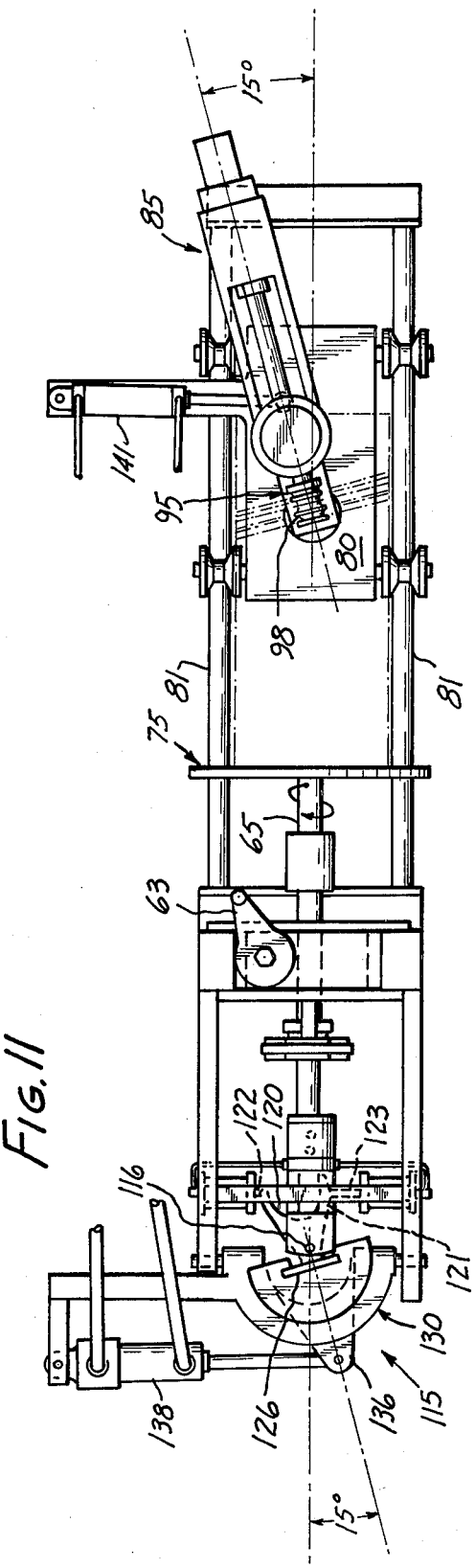

ELBOW-MAKING MACHINE

This invention relates to a means for forming the portions of an elbow for furnace pipe.

Elbows for furnace pipe are well-known. Furnace pipe itself is customarily made from rolled galvanized iron sheet closed at a longitudinal seam. It is an inexpensive construction for conveying large volumes of low pressure air. Elbows are customarily formed from a plurality of tube pieces which have mitered ends, i.e., ends cut off in a plane disposed at an angle relative to the longitudinal axis of the tubing itself. The intersection of a plane and a circular cylinder at an oblique angle to the longitudinal axis is an ellipse, and therefore the angle of inclination is kept rather small, usually about 15°, so that these elliptical intersections can be joined together along their planes and the sections then rotated relative to one another to adjust the angular alignment, still keeping a closed joint. Small differences from circularity can be accommodated by the springiness of the material. Still it is necessary that the end edges lie in a nearly true plane. Otherwise, rotation cannot occur.

The ends of the elbow sections are presently cut on such a plane. Classically, the ends are cut by placing a cutter guide as a collar mounted around the tube. Then using this guide to guide a cutter, the cutter is run around the tube. This is hand work, and a skilled operator is required to put the collar on, feed the collar and tube through a cutter, loosen the collar, rotate it 90° and end-for-end, and accurately make the next cut. Because it is hand work and relies on the judgment and manipulative ability of the operator for accuracy, the elbow sections from a single tube are kept together as matched sets, and the parts are not interchangeable from set to another. Accordingly, known procedures for making these elbows are expensive, wasteful of hand labor, and require handling as matched sets.

It is an object of this invention to provide a device to mechanize and reduce the cost of making these elbows, and to produce parts for elbows which are interchangeable and do not have to be kept together in matched sets.

It will be of assistance in understanding this invention to realize that the cutting of the wall of the tube to form the ends at the correct angle requires that the cutting wheel be maintained in a forwardly-facing direction at the correct angularity. Basically, this means that if the tube is rotated relative to the cutter so as to pass the cutter to be cut, either the tube or the cutter must be axially oscillated. The cutter itself must angularly be twisted twice for each tube revolution in order to make the correct shape. It is the function of this invention to cause these movements to occur, and to provide also for a reversal of the inclination of the angularity of the cut from cut to cut. In a 90° bend, different angularities are required in order for some of the sections to have properly inclined edges.

A device according to this invention is provided with means to hold and to rotate the tubing which is to be cut, and to support cutting means relative thereto. Means is provided to axially oscillate the tube relative to the cutter and to angularly position the cutter relative to the advancing tube surface being cut, whereby the cutter substantially directly tracks the metal to be cut.

According to a preferred but optional feature of this invention, a positioning means is provided which has an anchored portion that receives a wobble plate, and with a converter provides both the axial oscillation movement and the angular adjustment of the means.

This invention will be fully understood from the following detailed description and the accompanying drawings, in which:

FIGS. 8, 9 and 10 are respectively left, right and top views of FIG. 7; and

FIG. 11 is a view similar to FIG. 10, but in another operating position.

Figure 3:
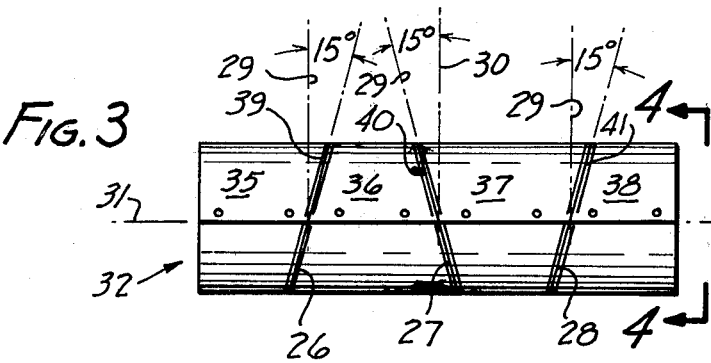
FIG. 3 is a top view of FIG. 2.
Figure 4:
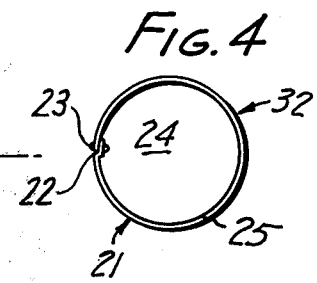
FIG. 4 is a right hand end view of FIG. 3.
Figure 2:
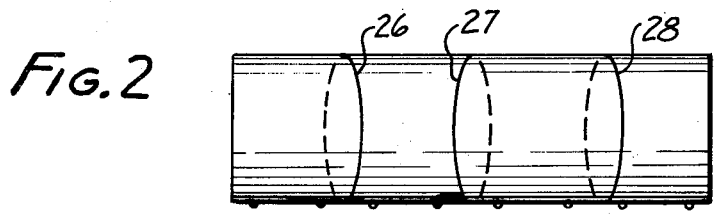
FIG. 2 is a top view of a straight piece of pipe showing the location of cuts to be made by this invention.
Figure 1:
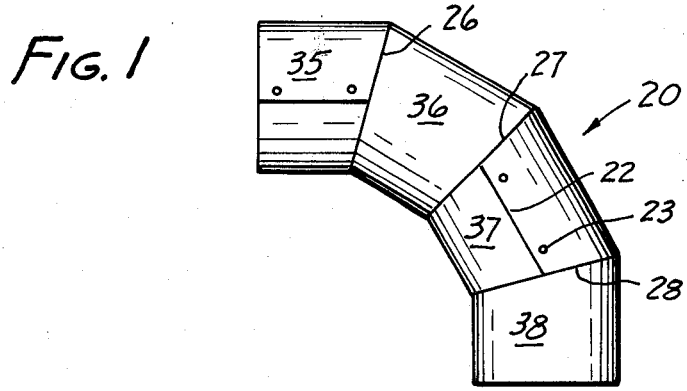
FIG. 1 is a side view of an elbow made from pipe sections cut by the machine of the invention.

The invention itself will best be understood by an initial consideration of the product to be made by it, and of the geometry of certain of its component parts. FIG. 1 illustrates an elbow 20 for a piece of pipe, such as furnace pipe. It customarily is made of a rolled sheet 21 of galvanized iron (FIGS. 3 and 4) which has an overlapping seam 22 closed by rivets 23 or other fastening means. This pipe forms a passage 24 for low pressure air, and the passage is defined by the metal peripheral wall 25. It is the object of this invention to cut this peripheral wall so that from a straight piece of tube shown in FIG. 2 the elbow shown in FIG. 1 can be formed. For this purpose, mitered cuts 26, 27, 28 are made.

The cuts are made at a reference angle 29 to a plane 30 normal to the longitudinal axis 31 of the straight tube 32. It will be observed that the cuts are initially alternately inclined relative to the longitudinal axis so that elbow pieces 35, 36, 37 and 38 are uniquely related to each other.

It is common practice reduce the diameter of the edge of one piece so it can slip past the edge of the other, and then to crimp the pieces together in a bead-like bend which permits rotation. Edges are reduced as appropriate at the time the cut is made, and the crimp is rolled when the elbow is assembled. Because of this feature, none of the pieces will be interchangeable with any of the other pieces in the same set. But it is an advantage of this invention that any piece 35, 36, 37 or 38 can be substituted for by another piece 35, 36, 37 or 38 to make up a set, even though it was cut from a different length of tubing. Thus instead of having to handle four specific pieces as a matched set, it is possible simply to withdraw pieces 35, 36, 37 and 38 at random from a collection of respective pieces to make up an elbow. This is a very significant advantage.

Where the crimps 39, 40 and 41 are set (FIG. 3) a rotatable joint is formed at each crimp. While it is true that the end faces are elliptical rather than truly circular, with the 15° inclination on a tube of diameter 3 or 4 inches or greater, the difference between ellipticity and true circularity can readily be accomodated by the springiness of a practical joint. There is a small amount of distortion, but it does permit rotation, and does make a good enough seal.

FIG. 1 shows alternate pieces having been twisted 180° as shown by the disappearance of the seam lines from pieces 36 and 38 in the view of FIG. 1. A 90° elbow has been formed. Differences in direction of the elbow can be created by twisting the various parts of the elbow relative to one another through different angles.

Accordingly it is the object of this invention quickly and automatically and sequentially to cut the mitered cuts 26, 27 and 28. At the same time, one edge of each cut can be reduced or enlarged to enable the overlapping of the edges. The edges are cut so that their inclinations are precisely related to one another, i.e., so that on a given length of tubing the nearest and farthest approaches to the cuts where formed are in a straight line and properly spaced apart. The parts of the pairs are then interchangeable.

Figure 5:
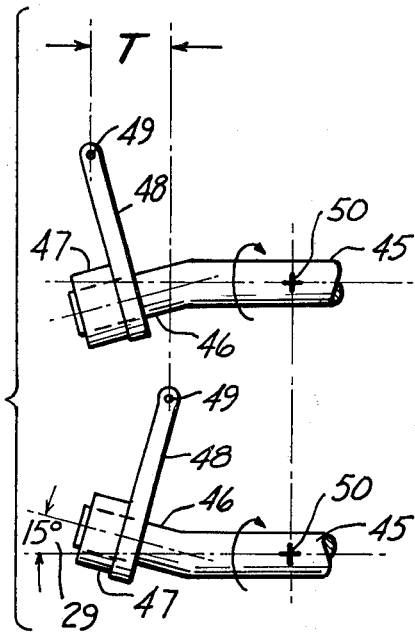
FIGS. 5 and 6 are schematic drawings illustrating a feature of the invention.
Figure 6:
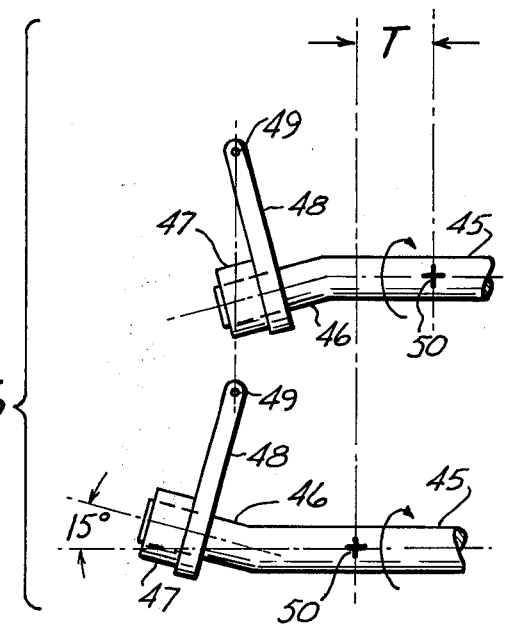

The theory of one of the most difficult parts of this machine to comprehend, which is also the part that makes its preferred embodiment so simple and reliable, is partially explained in FIGS. 5 and 6. In FIG. 5, a rotary shaft 45 is shown with an off-set portion 46 that has a bearing 47 thereon, and a wobble plate 48 which is held against the bearing so that it can rotate around the off-set portion 46. It is restrained against rotation, but can twist and swing.

It is evident that when the rotary shaft is rotated the wobble plate will constantly change its angularity as seen in side elevation. In fact it will remain tangent to a cone whose central angle is twice 75°. More to the point, assuming that reference point 49 is held against axial movement (FIG. 6), a second reference point 50 will have moved by a distance T when the shaft is rotated 180°. It is obvious that there will also have been twisting motion of the wobble plate, but that is another matter. The purpose at this point is to explain an axial movement of the shaft.

In FIG. 5, for illustration a different arrangement is shown, wherein reference point 50 instead of reference point 49 is held against axial movement. Then reference point 49 will have shifted by the same distance T after a 180° rotation of the shaft.

What FIGS. 5 and 6 show is that the 180° rotation of the shaft between the two illustrated positions causes a physical movement T which can be used to locate the cutter and the tube axially relative to each other.

In the preferred embodiment of the invention the reference point 49 is restrained to cause the tube to shift and be positioned properly for cutting relative to cutter means. The twisting movement, and the up and down slack required in the wobble plate will be discussed separately.

Figure 7:
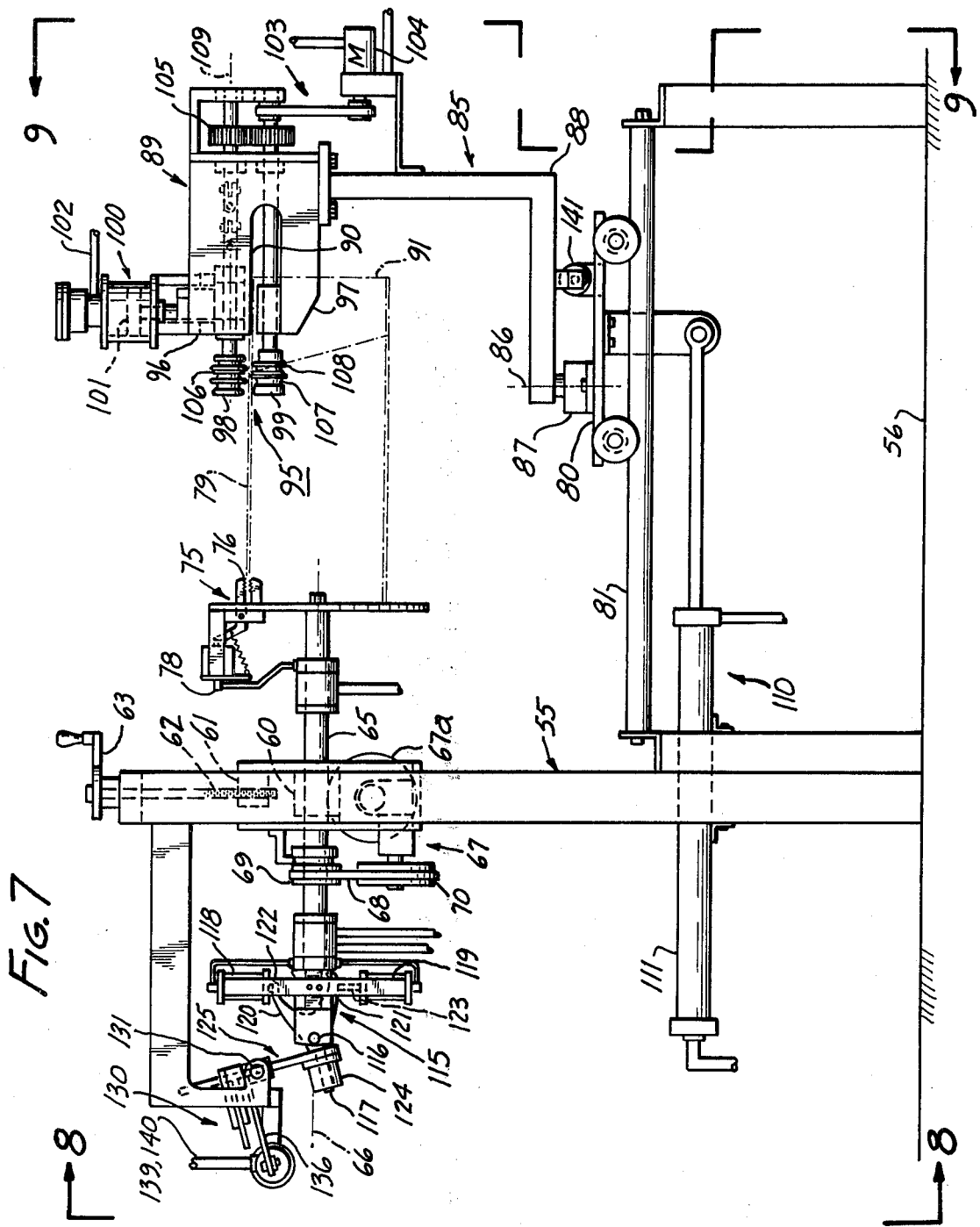
FIG. 7 is a side elevation of the presently preferred embodiment of the invention.
Figure 9:
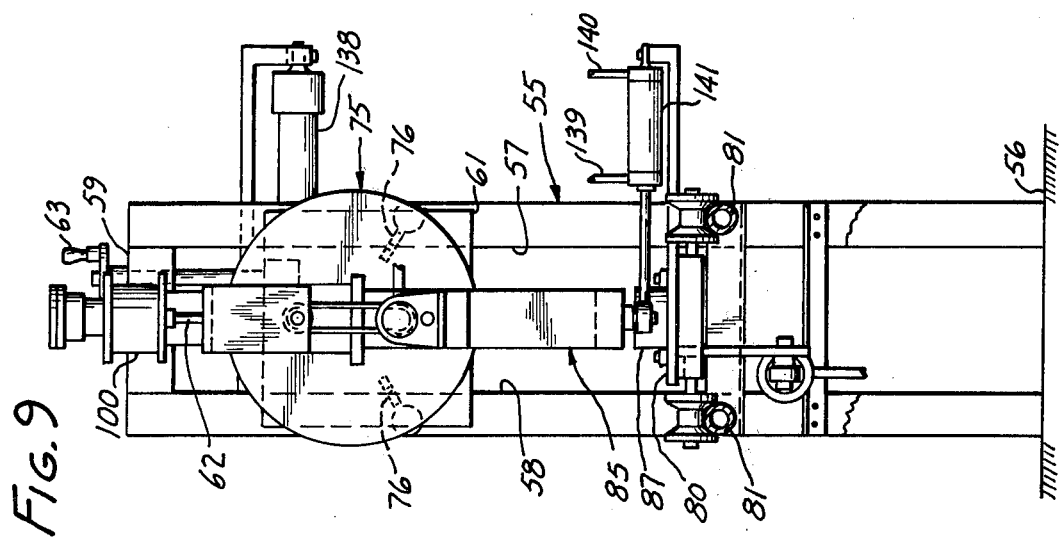
Figure 8:
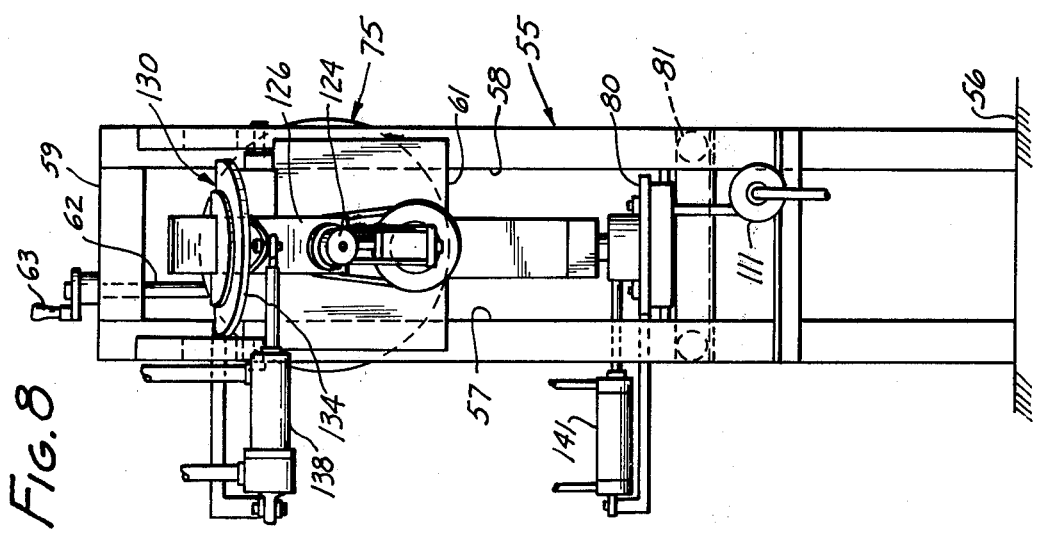

The presently preferred embodiment of the invention is shown in FIG. 7. It has a frame 55 adapted to rest on a base 56. The frame has uprights 57, 58 joined by crossmember 59 (FIG. 8). The frame supports a main journal 60 which is mounted in a vertically movable slide block 61 sliding on uprights 57 and 58 which act as guide rails.

An elevation screw 62 having a handle 63 can be turned to move the main journal up and down for purposes yet to be described.

The main journal 60 comprises "supporting means" which mounts a collet shaft 65 on a horizontal axis 66. The collet shaft can rotate around this axis, and is powered by drive means 67 in the form of a motor 67a mounted to the frame and driving the same through a chain 68 and a pair of sprockets 69, 70. Accordingly collet shaft 65, rotating around axis 66 can turn collet means 75 around the same axis. The collet means is provided with a plurality of pairs of grippers 76, which are opened and closed by actuators 78 to open, to receive, and to close, to grasp the end of a length of tubing 79 to be cut in accordance with the invention. Accordingly the collet means with its grippers comprises means to hold the tube for driven rotation around this axis.

A carriage 80 mounted to rails 81 on the frame is adapted to shift to the right and the left in FIG. 7, i.e., parallel to axis 66. The carriage carries with its cutter mounting means 85 which are supported for rotation around a vertical axis 86 by a vertical bearing 87. Means 85 includes an arm 88 which extends rearwardly and upwardly to a fork 89 which has an opening 90 that faces toward the collet means and is adapted to receive an end 91 of the tube to be cut. Cutter means 95 is carried by the fork.

The cutter means comprises a pair of roller cutters 98, 99, which have complementary peripheral cutting edges that cut in the direction they roll. They are mounted on tangs 96, 97, respectively. Cutter 98 can be moved toward and away from cutter 99 by a motor means, preferably a piston-cylinder assembly 100 mounted to tang 96. The up or down position of upper cutter 98 is determined by the position of piston 101 as caused by fluid pressure selectively exerted to line 102. A spring (not shown) can be used to retract it. Alternatively, a two-way powered piston-cylinder assembly can be used. Then fluid pressure would be exerted to retract the cutter, rather than the force of a spring.

The cutters may be moved apart by the motor means so as to straddle the tube. They then can be pressed together to perform a cutting operation. If desired, a bead or reduced-diameter end can be made at the same time with additional dies, but this is an optional feature. It could instead be done in a second operation. This invention is primarily related to the cutting operation. A simultaneous rolling operation is a useful feature.

The cutters are turned by a cutter drive 103 comprising a motor 104 and a transmission 105 which counterrotates the cutters. One cutter includes at least one cutting disc 106. If the rolling function is to be accomplished while cutting, there will also be a pair of roller discs 107, 108. These face cooperating elements on the other of the cutters. Accordingly the cutting disc will cut the pipe and the roller discs (when used) will form a suitable edge shape.

The cutting disc will cut best when run along a path in a plane normal to its own rotational axis 109. It is an object of this invention for the cutter mounting means to keep the cutting disc sensibly parallel to its path relative to the advancing surface of the pipe to be cut. Swiveling the cutter mounting means around the axis defined by vertical bearing 87 can cause such alignment. It will be noted that the bearing 87 is below the cutterrollers and vertically in line with them.

Shift means 110 comprises a piston-cylinder motor 111 for shifting the carriage back and forth so as to determine the point relative to the frame at which the carriage stands. Conventional cam and hydraulic control mechanisms typical of screw machine design may be provided for operating a motor 111 appropriately to position the carriage for each cut. Because this is conventional it will not be shown in detail in this disclosure.

At the left hand end of the collet shaft 65 is a portion of positioning means 115. It is the purpose of this positioning means to cause axial movement between the collet and the cutting means, and also to swivel the cutter means around the vertical axis 86. Furthermore, because the inclination of the various cuts is opposite from one another (see FIG. 3) it is necessary to reverse the inclination of the cut for best production.

For this purpose there is provided a cross pin 116 which mounts an off-set shaft 117 to the collet shaft. This will be recognized as the off-set portion shown in FIGS. 5 and 6. Its inclination is determined by a pair of setting motors 118, 119 which respectively bear against the arms 120, 121 integral with the off-set shaft on the opposite side from the cross pin. These are also pivoted to the cross pin. They form a "wishbone" wherein one or the other bears against shaft 65, as determined by the settings of motors 118 and 119. The settings are 15° on one side or on the other side of axis 66. When setting motor 119 is energized so that its plunger 122 is extended and motor 118 is relaxed so that its plunger 123 is retracted, then the inclination of shaft 117 is as shown. When the condition of the motors is reversed, then the inclination of shaft 117 would be the opposite. As explained in connection with FIG. 6, the collet shaft would be shifted to the left in FIG. 7.

At the end of off-set shaft 117 there is a bearing 124 to which is mounted a wobble means 125 in the form of a plate 126. This plate is free to rotate relative to off-set shaft 117 but because it is part of bearing 124, it is constrained to a wobbling motion eccentrically around the horizontal axis. This wobble plate is the equivalent of a disc mounted to the shaft at the reference angle, but the arrangement shown is simpler for the analysis of its components than a rotating disc.

The positioning means further includes a converter 130 mounted to a horizontal bearing 131 on the frame so it has rotational motion but not axial motion. Bearing 131 corresponds to point 49 in FIG. 6. The converter includes an embrasure 132 with a slot 133 which receives the rectangular plate so that it can slide up and down, but is restrained by it against rotation. In turn, a rocking embrasure mount 134 is pivotally mounted to bearing 131 and includes a bearing 135 which permits the embrasure to rotate within the mount. Therefore the wobble plate is able to move up and down in the embrasure. When it moves side to side the embrasure rotates in the rocking embrasure mount.

Because the embrasure mount is held against axial movement, then when cranking motion takes place, the wobble plate can move up and down in the slot and is rotated from side to side. Because of its constraints it will pull the collet shaft back and forth on its own axis. This determines an axial position of the collet relative to the rotational position of the collet and of its collet shaft.

The angular positioning of the cutter means is caused by following the action of the embrasure, and for this purpose there is provided a take-off lever 136 which is fixed to the embrasure and pivotally connected to the piston 137 of a master cylinder 138. The master cylinder includes a piston (not shown) and a pair of hydraulic lines 139, 140 which conduct fluid displaced therefrom as a consequence of movement of the take-off lever to ports of a slave cylinder 141 whose piston and rod in turn serve to turn the cutter mounting means, because the master and slave portions of the system are geometrically similar. The master cylinder is mounted to embrasure mount 134 so as to rock with it.

It will therefore be seen that the rocking of the wobble plate will rock the embrasure which will in turn, through the master slave situation, turn the cutter mounting means, and appropriately position the cutter means so that it faces in the direction of the cut being made. Therefore the positioning means constitutes a device whereby both to shift the collet and cutter means axially relative to one another and to provide for rotation of the cutter means to make it track appropriately. Persons skilled in the art will recognize that this is an elegant solution to the problem. It is its simplest and best mode known to the inventor. However, it is possible to separate the functions of rotational control of the cutter means alignment and of the shifting of the collet and also to shift the cutter means relative to a stationary collet rather than to shift the collet relative to a stationary cutter means. All of these equivalents will be evident to a person skilled in the art who understands this invention, and are within the scope of this invention. This invention provides an elegantly simple means for making the aforesaid adjustments.

In operation, the carriage is first shifted out of the way and a tube put in the collet. The carriage is then shifted so that the cutter means is in its starting position, for example as shown in FIG. 7, with the cutter means apart. Then the cutter means are clamped together against the peripheral wall. Then the drive motor is driven so as to turn the collet at least one full turn, with the cutter means also driving. The wobble plate acts as shown, both axially to shift the collet relative to the cutter means and to rotate the cutter means relative to the advancing path of the material to be cut.

At the end of at least one revolution of the tube, the cut is completed, the cutter means are released and the carriage is moved to its next axial position to make the second cut. The second cut is opposite in inclination and therefore the setting motor condition is reversed so as to change their relative position. This will cause movement of the collet. Then the cutter means is again clamped down and the next cut is made as before.

Thereafter, the cutter means is released, the carriage again shifted, the inclination changed by reversing the settings of motors 118 and 119, the cutter means clamped again and the drive repeated. Then the cutter means are released and the collet means is released and the parts of the elbow are complete.

It is possible to make a cut by turning the tube precisely 360°, but it is not practical. When cutting metal with disc type cutters, it takes some travel for the cutter to pierce the metal unless very strong forces are exerted. It is better practice to go into the metal gradually, and this might take as much as 20° of travel. Therefore it is best practice to make the cut over perhaps 1½ or 2 turns. For example, the first two cuts can advantageously be made by 1½ turns and the last by two turns. Then the device is properly aligned for the start of a new set of cuts at the end of the last of the cuts. It is best practice to start the cuts at the top or at the bottom, where the cutter is most nearly aligned with its path. Although an electro-mechanical brake can be provided to stop the rotation at a precise point, this usually will not be necessary. Electric DC-SCR controlled drives do a quite satisfactory job of precisely starting and stopping the device.

Automatic cycling means and means for stepping the carriage the appropriate distance each time are clearly obvious to a person skilled in the art and will not be described in detail here.

The elevation at which the cuts are made is determined by the cutter means and their elevation is not changed. Accordingly, in order to cut different diameters of tubing, the elevation screw is turned to raise and lower the collet shaft, leaving the upper edge of the tube, whatever its diameter, in condition to be cut. When this movement occurs, the wobble plate simply slides in the slot in the embrasure. The change in this elevation will make a small angle change in the angularity of the cut, but this is immaterial to the production of a suitable elbow. The dimensions will be selected to minimize this effect.

It might be commented that the master cylinder is mounted to and rocks with the embrasure mount, so that the take-off lever's motion is translated into an accurate angularity. There may be some small-angle errors but these are minor. It may also be pointed out that instead of driving a direct master slave relationship, a typical tracer valve or four way valve hydraulic system might be used to power the motor driving the cutter mounting means. These are also referred to as "slave means".

This invention thereby provides an elegant and rugged means for cutting mitered joints on a tubing and for the rapid and accurate production of elbows for pipes such as for furnace pipes.

This invention is not to be limited by the embodiments shown in the drawings and described in the description which are given by way of example and not of limitation, but only in accordance with the scope of the appended claims.

I claim:

1. Mechanism for cutting ends on circularly cylindrical pipe, said pipe having a longitudinal axis and a peripheral wall, said mechanism comprising:
    a frame;
    collet means to grip and to rotate the pipe around its longitudinal axis;
    a collet shaft to support and turn said collet means;
    drive means to turn said collet shaft;
    cutter means having a cutting edge to cut the wall of said pipe;
    cutter mounting means supporting said cutter means, said cutter mounting means rotatably mounting the cutter means for rotation of its cutting edge around its point of contact with a pipe being cut;
    supporting means mounting one of said collet shaft or cutter mounting means for axially shifting the same;
    positioning means for moving the supporting means and cutter mounting means to make a cut in the pipe, with the cutter means substantially aligned with its cutting path, said positioning means comprising: wobble means mounted to said collet shaft having a wobble axis at a reference angle to the axis of rotation of the collet shaft, whereby a plane normal to the wobble axis, when turned around the axis of rotation, is tangent to a cone; a converter comprising an embrasure which grips the wobble means and enables it to slide therein, rocking embrasure mount mounting the embrasure for rotation with the wobble means, and slave means interconnecting the embrasure and the cutter mounting means, whereby the angular position of the cutter means corresponds with the angular position of the wobble means, one of said collet shaft or the embrasure mounting being restrained to the base against axial movement, the other being axially shiftable relative to the base, whereby the relative axial position of the cutter means and of the collet is a function of the angular position of the wobble means.

2. Apparatus according to claim 1 in which elevation adjustment means is provided which laterally moves the collet shaft relative to the cutter mounting means, whereby to accommodate pipe of different diameters, the wobble means being slidable in said embrasure.

3. Apparatus according to claim 1 in which said slave means comprises a first piston-cylinder assembly mounted to the embrasure mount and connected to the embrasure, and a second identical piston cylinder assembly being mounted to said cutter mounting means and connected to said cutter means.

4. Apparatus according to claim 1 in which said wobble means is pivotally connected to the collet shaft by a cross pin, and setting means to determine from which of two sides of the collet shaft the wobble means extends.

5. Apparatus according to claim 4 in which said setting means comprises a pair of motors, each to move the wobble means in a respective direction.

6. Apparatus according to claim 5 in which said wobble means comprises a shaft with a wishbone formed of two arms, which drive and limit the setting movement of the wobble means.

7. Apparatus according to claim 1 in which the cutter means comprises a pair of wheels, and in which means is provided to press the wheels together or release them.

8. Apparatus according to claim 1 in which the cutter mounting means comprises an arm swingable around an arc substantially centered at the cutting point of the cutter means.

9. Apparatus according to claim 8 in which a cutter drive turns the cutters.

10. Apparatus according to claim 1 in which the supporting means comprises a carriage mounted to the frame carrying said cutter mounting means.

11. Apparatus according to claim 2 in which said slave means comprises a first piston-cylinder assembly mounted to the embrasure mount and connected to the embrasure, and a second identical piston cylinder assembly being mounted to said cutter mounting means and connected to said cutter means.

12. Apparatus according to claim 11 in which said wobble means is pivotally connected to the collet shaft by a cross pin, and setting means to determine from which of two sides of the collet shaft the wobble means extends.

13. Apparatus according to claim 12 in which said setting means comprises a pair of motors, each to move the wobble means in a respective direction.

14. Apparatus according to claim 13 in which said wobble means comprises a shaft with a wishbone formed of two arms, which drive and limit the setting movement of the wobble means.

15. Apparatus according to claim 12 in which the cutter means comprises a pair of wheels, and in which means is provided to press the wheels together or release them.

16. Apparatus according to claim 15 in which the cutter mounting means comprises an arm swingable around an arc substantially centered at the cutting point of the cutter means.

17. Apparatus according to claim 16 in which a cutter drive turns the cutters.

18. Apparatus according to claim 16 in which the supporting means comprises a carriage mounted to the frame carrying said cutter mounting means.

19. Apparatus according to claim 18 in which said setting means comprises a pair of motors, each to move the wobble means in a respective direction.

20. Apparatus according to claim 19 in which said wobble means comprises a shaft with a wishbone formed of two arms, which drive and limit the setting movement of the wobble means.

* * * * *